US007231432B2

(12) United States Patent
Aoki

(10) Patent No.: US 7,231,432 B2
(45) Date of Patent: Jun. 12, 2007

(54) IMAGE FORMING DEVICE THAT AUTOMATICALLY UPDATES SHORTCUT KEY DATABASE WHEN NETWORK DATA IS RECEIVED

(75) Inventor: Kazuma Aoki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 614 days.

(21) Appl. No.: 10/384,726

(22) Filed: Mar. 11, 2003

(65) Prior Publication Data

US 2003/0187958 A1 Oct. 2, 2003

(30) Foreign Application Priority Data

Mar. 27, 2002 (JP) ............................ 2002-088672

(51) Int. Cl.
*G06F 15/16* (2006.01)
*H04N 1/00* (2006.01)
*H04N 1/32* (2006.01)

(52) U.S. Cl. .................. 709/219; 358/426.06; 358/468

(58) Field of Classification Search ................ 709/232, 709/219; 358/426.05, 468
See application file for complete search history.

(56) References Cited

U.S. PATENT DOCUMENTS 5,930,553 A * 7/1999 Hirst et al. .................... 399/8
6,587,455 B1 * 7/2003 Ray et al. ................... 370/352
6,587,873 B1 7/2003 Nobakht et al.
6,661,980 B2 * 12/2003 Matsumoto et al. .......... 399/27
6,745,223 B1 6/2004 Nobakht et al.
6,785,716 B1 8/2004 Nobakht
6,813,639 B2 11/2004 Nobakht et al.
7,111,051 B2 9/2006 Nobakht et al.
2001/0054112 A1 12/2001 Nobakht et al.
2002/0120683 A1 * 8/2002 Gomes et al. .............. 709/203

FOREIGN PATENT DOCUMENTS

JP 11234451 A * 8/1999
JP A 11-234451 8/1999
JP A 11-328076 11/1999
JP A-2001-167024 6/2001
WO WO 01/56252 8/2001

OTHER PUBLICATIONS

Boulton, Clint, "Xerox Taps Internet with New Fax Machines", Feb. 25, 2000, www.internetnews.com/bus-news/print.php/310711.*
Japanese Patent Office communication for patent application 2002-088672 mailed Oct. 3, 2006.

* cited by examiner

*Primary Examiner*—Rupal Dharia
*Assistant Examiner*—Brian J. Gillis
(74) *Attorney, Agent, or Firm*—Oliff & Berridge, PLC

(57) ABSTRACT

An image forming device includes a shortcut key database. The shortcut key database stores address data in association with corresponding numeral keys, enabling a user to specify desired address data by pressing a corresponding numeral key. When download data form a server is network data including address data, then the shortcut key database is automatically updated with the data address included in the network data.

9 Claims, 11 Drawing Sheets

115C

| URL | MEMO | MONTHLY (DATE) | WEEKLY (DAY) | DAILY (TIME) |
|---|---|---|---|---|
| http://www.**.co. jp/ | XX COMPANY | 15 | – | – |
| http://www.**.co. jp/subdir/ | XX SHOP | – | THURS. | – |
| http://www.**.ne. jp/abc.htm | XX NEWSPAPER | – | – | 10:00 |
| http://www.**.go. jp/ | XX OFFICE | – | – | – |
| http://www.**.com/top.html | ***** | | | |

SCHEDULER SETTING DATA

115I

| SPACIFICATION | RECORD SETTING | DISPLAY SETTING |
|---|---|---|
| IMAGE OUTPUT | ON | OFF |
| RESOLUTION | 600 dpi | 96 dpi |
| IMAGE SIZE | ——— | ——— |

| FUNCTION / OPERATING MODE | PRINT | SAVE | PRINTER TRANSFER | PC TRANSFER | MONOCHROME PRINT | QUIET PRINT | LOG SAVE | ERROR DISPLAY |
|---|---|---|---|---|---|---|---|---|
| NORMAL | 1 | 0 | 0 | 0 | 0 | 0 | 1 | 0 |
| URL ACCESS NOT AUTHORIZED | 0 | 0 | 0 | 0 | 0 | * | 1 | * |
| CANCEL PRINT | 0 | 0 | 0 | 0 | 0 | * | 1 | * |
| PASSWORD ERROR | 0 | 1 | 0 | 0 | 0 | * | 1 | * |
| KEYWORD ERROR | 0 | 0 | 0 | 1 | 0 | * | 1 | * |
| SAME CONTENT DETECTED | 0 | 0 | 0 | 1 | 0 | * | 1 | * |
| NIGHTTIME PRINT | * | * | * | 0 | * | 1 | * | * |
| ANSWERING MACHINE | 0 | * | * | 1 | * | 0 | * | * |
| LARGE VOLUME MONOCHROME PRINTING | 0 | * | 1 | * | 0 | 0 | 1 | 0 |
| OUT-OF-PAPER ERROR | 0 | * | * | * | * | * | 1 | 1 |
| OUT-OF-TONER ERROR | 0 | * | * | * | * | * | 1 | 2 |

(1 OR GREATER: ON, 0: OFF)
(MONOCHROME PRINT – 1: BLACK, 2: CYAN, 4: MAGENTA)

FIG.10(A)

<Record>
<Comment>Nationwide weather</Comment>
<URL>http://www.xweather.com/nationwide</URL>
</Record>
<Record>
<Comment>Hokkaido region</Comment>
<URL>http://hokkaido.xweather.com/</URL>
</Record>
<Record>
<Comment>Tohoku region</Comment>
<URL>http://tohoku.xweather.com/new</URL>
</Record>
<Record>
<Comment>Hokuriku region</Comment>
<URL>http://www.hokuriku.xweather.com/</URL>
</Record>
...

| KEY | COMMENT | URL |
|---|---|---|
| 1 | NATIONWIDE WEATHER | http://www.xweather.com/nationwide |
| 2 | HOKKAIDO REGION | http://hokkaido.xweather.com/ |
| 3 | TOHOKU REGION | http://tohoku.xweather.com/new |
| 4 | HOKURIKU REGION | http://www.hokuriku.xweather.com/ |
| ... | | |

FIG.11(A)

```
<HTML>
<A href="http://www.xweather.com/nationwide">Nationwide weather</A>
<A href="http://hokkaido.xweather.com/">Hokkaido region</A>
<A href="http://tohoku.xweather.com/new">Tohoku region</A>
<A href="http://www.hokuriku.xweather.com/">Hokuriku region</A>
...
<HTML>
```

| KEY | COMMENT | URL |
|---|---|---|
| 1 | NATIONWIDE WEATHER | http://www.xweather.com/nationwide |
| 2 | HOKKAIDO REGION | http://hokkaido.xweather.com/ |
| 3 | TOHOKU REGION | http://tohoku.xweather.com/new |
| 4 | HOKURIKU REGION | http://www.hokuriku.xweather.com/ |
| ... | | |

IMAGE FORMING DEVICE THAT AUTOMATICALLY UPDATES SHORTCUT KEY DATABASE WHEN NETWORK DATA IS RECEIVED

BACKGROUND OF THE INVENTION

1. Field of the Invention

The present invention relates to an image forming device capable of receiving data from a web server, and particularly to an image forming device capable of automatically storing address data in a shortcut key database.

2. Description of the Related Art

Various proposals have been made related to the efficient transmission and reception of image data from the Internet. One example of a data acquisition system is described in Japanese Patent-Application Publication No. HEI-11-234451. This system includes a facsimile device, a web server, and a data manager provided between the facsimile device and the web server. When the data manager receives a call from the facsimile device, then the data manager identifies a URL address corresponding to the call, acquires data at the URL address from the web server, and converts the data to image data. The imaged data is transmitted to the facsimile device, and then the facsimile device prints the image data onto recording paper.

However, the above data acquisition system requires a user to input a prescribed telephone number. Hence, the user must constantly monitor the telephone number that specifies a URL address that can be arbitrarily updated and added by the web server, thereby increasing the user's burden.

SUMMARY OF THE INVENTION

In view of the foregoing, it is an object of the present invention to provide an image forming device capable of enabling a user to easily, quickly, and reliably obtaining desired content through a prescribed simple operation, without needing to confirm the update or addition of address data.

In order to overcome the above and other objects, according to the present invention, there is provided an image forming device including a communicating unit, an input unit, an image forming unit, a determining unit, a first memory, and an update unit. The communicating unit performs bi-directional communications with a server on the Internet. The input unit inputs an address data to the communicating unit. The communicating unit transmits a request data to the server when the address data was input to the communicating unit, the request data requesting the server to transmit a web data corresponding to the address data, and the communicating unit receives the web data corresponding to the address data from the server. The determining unit determines whether or not the web data received by the communicating unit is a network data, the network data including at least one set of address data. The first memory stores a shortcut database. The update unit updates the shortcut database. The control unit controls, when the web data is determined a network data, the update unit to update the shortcut database by storing the at least one set of address data included in the network data into the shortcut database in association with a corresponding operation data. The control unit controls, when the web data is determined not a network data, the image forming unit to form images on a recording medium based on the web data.

BRIEF DESCRIPTION OF THE DRAWINGS

In the drawings:

FIG. 4(*b*) is an explanatory diagram showing the data structure of a URL data storing unit in the RAM;

FIG. 4(*c*) is an explanatory diagram showing an example of data structure of record/display settings storing unit in the RAM;

FIG. 6(*b*) is an explanatory diagram showing the data structure of a flag data;

FIG. 7(*b*) is an explanatory diagram showing the data structure of attributes of the data of FIG. 7(*a*);

FIG. 10(*a*) is an explanatory diagram showing an example of network data downloaded by the web printing unit;

FIG. 10(*b*) is an explanatory diagram showing how the network data is recorded in a shortcut URL database file;

FIG. 11(*a*) is an explanatory diagram showing an another example of network data downloaded; and FIG. 11(*b*) is an explanatory diagram showing how the network data of FIG. 11(*a*) is stored in the shortcut URL database file.

DESCRIPTION OF PREFERRED EMBODIMENT

Next, an image forming device according to an embodiment of the present invention will be described with reference to the accompanying drawings.

Figure 1:
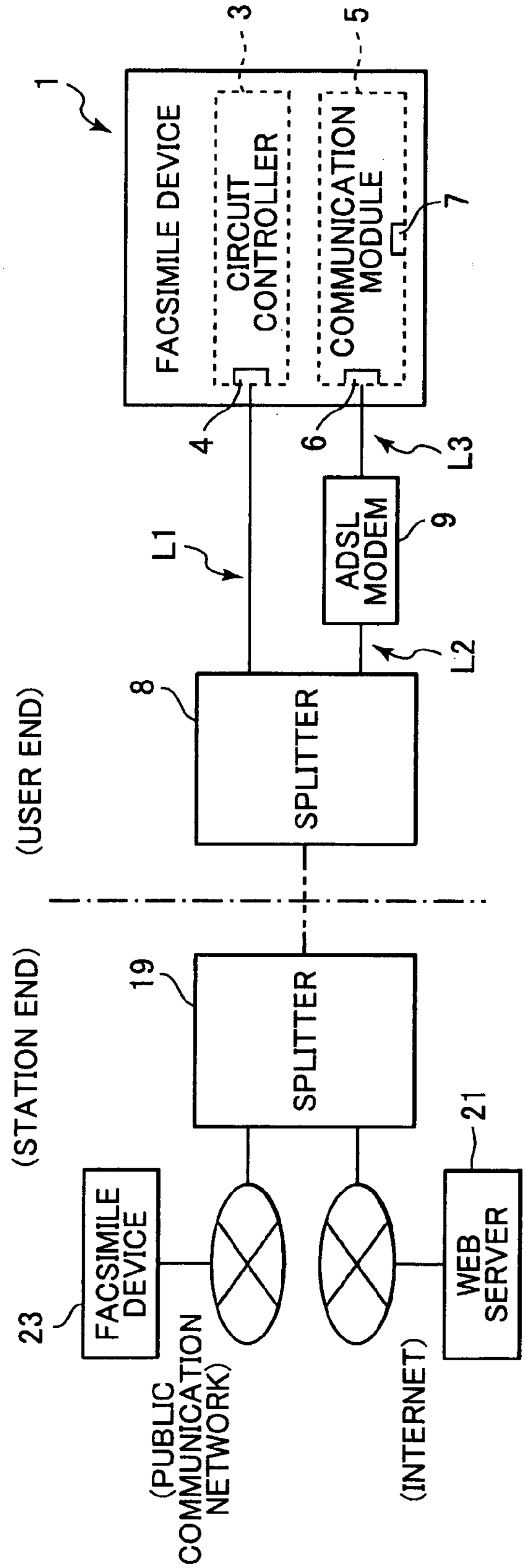
FIG. 1 is a block diagram illustrating an example of using a facsimile device according to an embodiment of the present invention.

As shown in FIG. 1, a facsimile device 1 according to the present embodiment includes a circuit controller 3 and a communication module 5. The circuit controller 3 is provided with an external connection port 4. An analog line L1 (a telephone line formed of either two or four leads) connects between the external connection port 4 and a telephone connection port on a splitter 8 provided in a home office or other building.

The communication module 5 is provided with a WAN connection port 6 and a LAN connection port 7. The WAN connection port 6 is connected to an ADSL modem 9 via a LAN cable L3. The LAN connection port 7 is connected to a local area network (LAN) provided in a building via a hub (not shown). The ADSL modem 9 is connected to an ADSL (Asymmetric Digital Subscriber Line) modem connection port in the splitter 8 via a LAN cable L2.

The splitter 8 is a device used for ADSL well known in the art. The splitter 8 is configured to receive a transmission signal from a splitter 19 provided on the base station end.

The transmission signal includes a first signal of about 4 kHz or less superimposed on a second signal of a higher frequency for ADSL. The splitter 8 separates the first and second signals and outputs the first signal to the telephone connection port and the second signal to the ADSL modem connection port. The splitter 8 also superimposes signals received via these connection ports and transmits the superimposed signal to the splitter 19 on the base station end.

That is, the facsimile device 1 of the present embodiment can connect to a subscriber telephone on a public communication network (that is, a public switching telephone network: PSTN) using the circuit controller 3. The facsimile device 1 can also connect to the Internet serving as a wide area network (WAN) via the communication module 5 and the ADSL modem 9.

Through operations of a router controller 101 (FIG. 3) provided in the communication module 5, the facsimile device 1 functions as a router for routing data (IP packets) that is transmitted and received between a communication device on the Internet (such as a web server 21) and LAN terminals on the LAN.

The facsimile device 1 of the present embodiment has a facsimile function, a printer function, and a copy function. The facsimile function optically scans images from an original document, converts image data representing the scanned image into facsimile data, and transmits the facsimile data via the analog line L1 to an external facsimile device 23 connected to the public communication network. The facsimile function also receives facsimile data transmitted from the external facsimile device 23 via the public communication network and the analog line L1, and forms images on a recording paper based on the facsimile data.

The printer function is a function for forming images on a recording paper based on code data transmitted by a word processor or a personal computer connected via the hab. When the facsimile device 1 receives code data from an external personal computer via a PC interface 24 (FIG. 3) or from the personal computer on the LAN via the communication module 5, the facsimile device 1 forms images based on the code data on recording paper. The copy function is a photocopying function for scanning images from an original document using a scanner 35 and a recording unit 37 (described later) and forming images on recording paper based on the image data.

Figure 2:
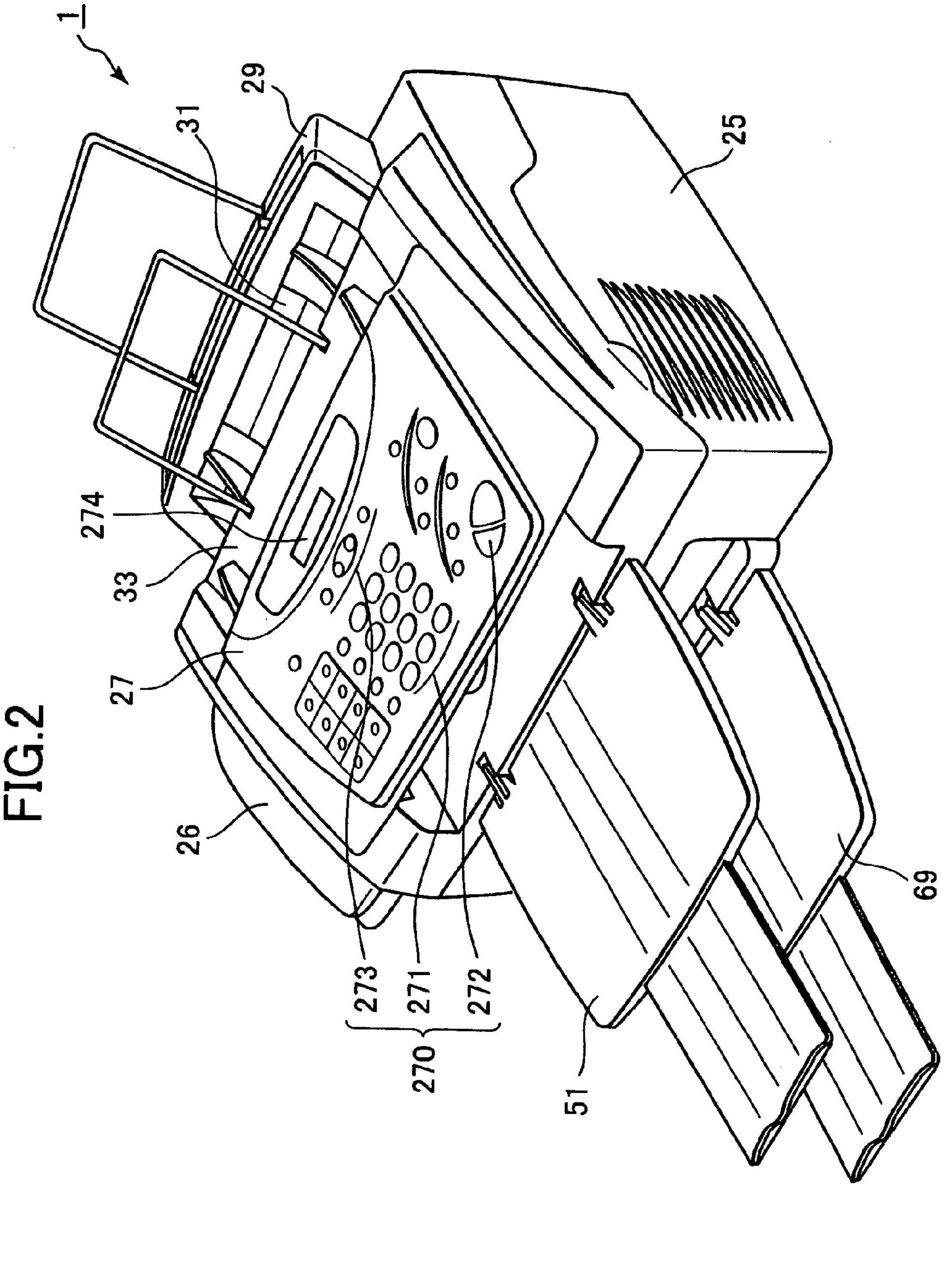
FIG. 2 is a perspective view of the external construction of the facsimile device.

As shown in FIG. 2, the facsimile device 1 having the functions described above includes an outer case 25, a handset 26 mounted on the side of the outer case 25, and an operating panel 27 provided on the front portion of the top surface of the outer case 25. The operating panel 27 is provided with various operating keys 270 including numeral keys 271 for inputting the telephone number (fax number) of other parties, a start key 272, and a select key 273, and a liquid crystal display (LCD) 274 for displaying data related to the various functions.

When pressed in conjunction with operations of the select keys 273, the numeric keys 271 function as shortcut keys in each mode.

In addition, a first paper tray 29 for accommodating recording paper to be fed into the device is provided on the top back portion of the outer case 25. A second paper tray 31 is provided above the first paper tray 29 to enable the user to feed recording paper by hand. An original document feed tray 33 is provided above the second paper tray 31 for accommodating original documents to be scanned.

The outer case 25 accommodates the scanner 35 for scanning images from an original document, the recording unit 37 for forming multicolor images on recording paper, and a circuit board (not shown) on which a CPU 39 (FIG. 3) is mounted for controlling the scanner 35 and the recording unit 37.

Next, the electrical configuration of the facsimile device 1 will be described.

Figure 3:
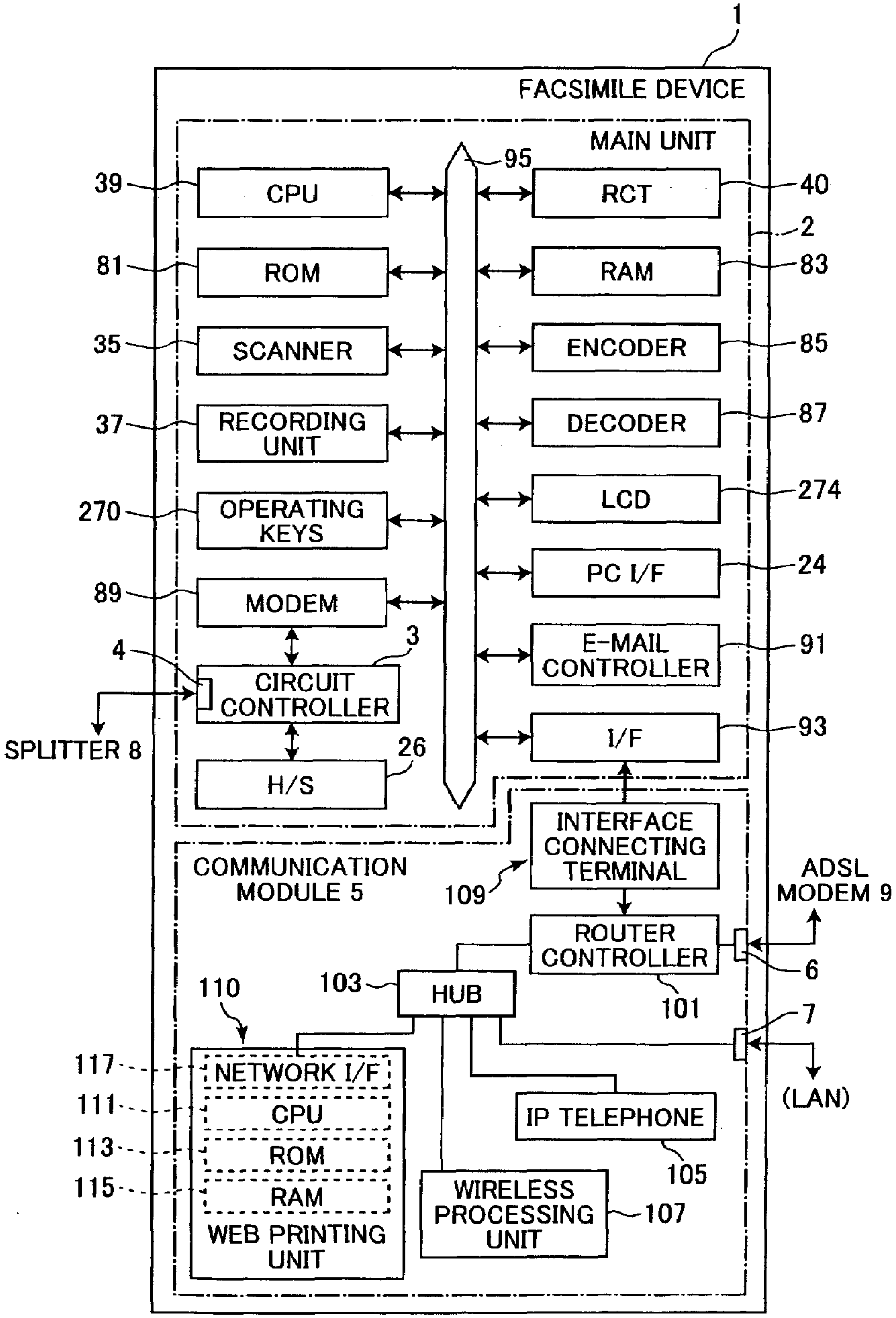
FIG. 3 is a block diagram showing an electrical configuration of the facsimile device.

As shown in FIG. 3, the facsimile device 1 primarily includes the CPU 39, a Real Time Clock (RTC) 40, a read only memory (ROM) 81, a random access memory (RAM) 83, the scanner 35, an encoder 85, the recording unit 37, a decoder 87, the operating keys 270, the LCD 274, a modem 89, the circuit controller 3, the PC interface 24, an e-mail controller 91, and a function expansion interface 93. All of these components are connected via a bus 95, and defining a main unit 2. The communication module 5 is connected to the function expansion interface 93.

The CPU 39 serves as the control center of the facsimile device 1 by performing overall control of the facsimile device 1. For example, the CPU 39 reads programs for control processes that are prestored in the ROM 81 and executes processes, such as transmission and reception of facsimile data, address entry, and web printer, according to these programs.

The RTC 40 measures the current date and time and outputs this data to the CPU 39 and the CPU 111 of the web printing unit 110.

The ROM 81 stores a facsimile function program, a printer function program, a web printer function program, and other programs not shown in the drawings, as well as various data required when executing the programs.

The RAM 83 includes a work area required when executing various control processes and is configured to store destination data, such as telephone numbers and e-mail addresses.

The scanner 35 functions to scan an original document when copying or transmitting facsimile data or the like. The scanner 35 of the present embodiment is configured to pick up the original document from the original document feed tray 33, scan the images with a scanning unit (not shown), and output image data to the encoder 85 and the like as scanning results.

The encoder 85 executes an encoding process for converting image data scanned by the scanner 35 into G3 compressed image data in a facsimile format, and outputs the converted image data. The decoder 87 decodes image data in the facsimile format for converting into image data that can be processed by the recording unit 37.

The recording unit 37 functions as a color laser printer capable of forming color images. The recording unit 37 uses a built-in image forming device (not shown) to print color images based on image data that has been encoded by the decoder 87 and according to instructions from the CPU 39 on recording paper, and discharges the printed recording paper externally.

The operating keys 270 function to input instruction signals into the device (the CPU 39 and the like) based on operations by the user in order to perform such operations as entering destination data, specifying a destination, and inputting or selecting memo data.

The LCD 274 functions as a display device for displaying various messages and the like, including error messages and messages for guiding the user steps of an operation. The LCD 274 also functions as a touch panel. When the user is specifying a destination for facsimile data or entering destination data, the LCD 274 displays one-touch keys and acquires and inputs user-inputted data into the device.

The modem 89 functions to transmit and receive facsimile data between the external facsimile device 23 connected to the public communication network via the circuit controller 3 and the splitter 8. The circuit controller 3 functions to transmit dialing signals to the public communication network, to answer calling signals from the public communication network, and the like. For example, the circuit controller 3 connects to and can communicate with the external facsimile device 23 via the public communication network.

The PC interface 24 is employed when connecting a personal computer to the facsimile device 1 via a parallel interface or the like and functions to receive code data and the like from the personal computer. The e-mail controller 91 transmits and receives facsimile data via e-mail by transmitting and receiving e-mail between an external communication device connected to the Internet.

In other words, the e-mail controller 91 converts binary image data in a fax format, which was encoded by the encoder 85, into text-coded image data, and adds header data including the e-mail address for the transmission destination and the like to the converted image data. In this manner, the e-mail controller 91 converts the image data in a fax format into image data in an e-mail format that can be transmitted as e-mail. Similarly, the e-mail controller 91 converts image data in an e-mail format received via the Internet and the communication module 5 back to image data in a fax format. The image data converted back in a fax format in this manner is then decoded by the decoder 87 so that the recording unit 37 can output, and the recording unit 37 prints out the data on recording paper.

The function expansion interface 93 is a serial interface, such as AIO (Analog Input/Output) or RS232C. The separate communication module 5 including the router controller 101 can be detachably connected to the function expansion interface 93. The communication module 5 is accommodated in the outer case 25 of the facsimile device 1, as shown in FIG. 3.

The communication module 5 includes the router controller 101, a hub 103, an IP telephone unit 105, a wireless processing unit 107, a web printing unit 110, an interface connecting terminal 109 connected to the router controller 101, and the like. The communication module 5 is connected to the function expansion interface 93 via the interface connecting terminal 109.

The router controller 101 is for transmitting and receiving IP packets between a communication device on the Internet via the ADSL modem 9, and functions as a broadband router well known in the art, having an IP masquerade function and a routing function. Using the IP masquerade function, the router controller 101 can convert both ways between a private IP address used on a LAN and a global IP address used on a WAN (the Internet in the present embodiment). Using the routing function, the router controller 101 can connect a terminal on the LAN end to a communication device on the WAN end (the web server 21) to perform bi-directional communications.

The web printing unit 110 includes a CPU 111, a ROM 113, a RAM 115, a network interface 117, and the like. The web printing unit 110 can connect itself to the Internet or communicate with the CPU 39 of the main unit 2 by communicating with the router controller 101 via the network interface 117.

Next, the data structure in the RAM 115 and the ROM 113 of the web printing unit 110 will be described with reference to FIGS. 4(*a*) through 6(*b*).

Figures 4A, 4B, 4C:
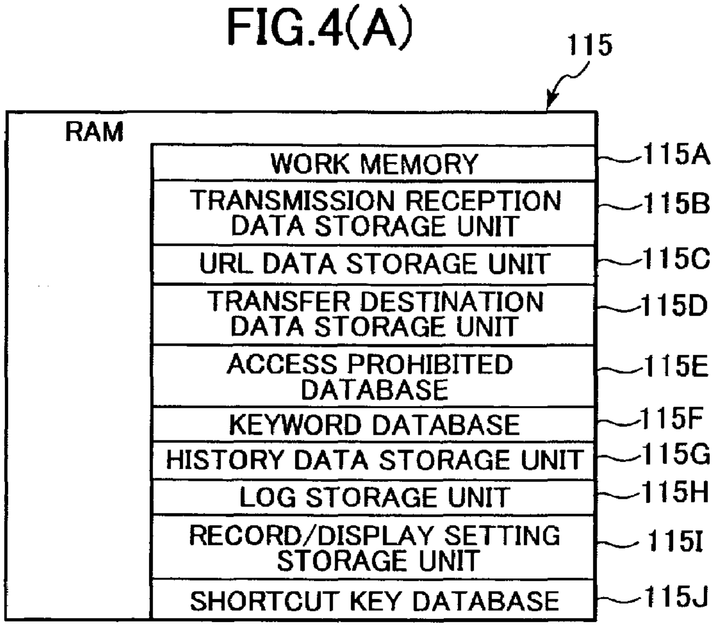
FIG. 4(*a*) is an explanatory diagram showing the data structure in a RAM of a web printing unit in the facsimile device.

As shown in FIG. 4(*a*), the RAM 115 in the web printing unit 110 functions as a work memory 115A, a transmission/reception data storage unit 115B, a URL data storage unit 115C, a transfer destination data storage unit 115D, an access prohibited database 115E, a keyword database 115F, a history data storage unit 115G, a log storage unit 115H, a record/display setting storage unit 115I, and a shortcut key database 115J.

The transmission/reception data storage unit 115B is for storing data downloaded from the web server 21 and the like. The URL data storage unit 115C is for storing address data (URL: Uniform Resource Locator) indicating data that the web server 21 provides. The transfer destination data storage unit 115D is for storing transfer destination data regarding the destination for transferring data when using a transfer function to transfer data to an external personal computer and the like. The record/display setting storage unit 115I is for recording print settings and display settings.

As shown in FIG. 4(*b*), the URL data storage unit 115C can store a plurality of entries of memo data and scheduler setting data in association with the URL representing the address for accessing the data. In other words, the communication module 5 stores memo data, which the user inputs externally through operations on the operating panel 27 and the like, in association with corresponding URLs into the URL data storage unit 115C. As is well known in the art, a URL is address data indicating data that a web server has, and the address data is configured of a server address, directory data, filename, and the like.

Brief description for a process for storing URL-memo data will be provided. The process for storing URL-memo data is executed by the CPU 111 in the web printing unit 110.

First, the CPU 111 transmits an input instruction to the main unit 2 via the function expansion interface 93, so that the LCD 274 displays an input prompt. Next, the CPU 111 waits until an instruction for storing a URL and memo data is received from the operating panel 27 via the function expansion interface 93. When the instruction is received, then the CPU 111 acquires the URL and the memo data, which have been input from the operating panel 27 of the main unit 2. Then, the CPU 111 associates the URL with the memo data, and stores the URL and the memo data in the URL data storage unit 115C.

Here, the memo data is provided to enable the user to quickly determine a desired URL, since it is difficult to determine what home page to access only by the URL display and moreover it is not easy to search for a desired URL because the display area of the LCD 274 is limited.

Scheduler setting data is inputted externally through operations by the operating panel 27 and the like. The scheduler setting data include "monthly (date)" specifying a date in each month, "weekly (day of the week)" specifying a day in each week, and "daily (time)" specifying a time in each day.

For example, scheduler setting data stored in association with the topmost URL in FIG. 4(*b*) indicates that data is to be obtained from the web server 21 on the $15^{th}$ of each month. Scheduler setting data stored in association with the URL of the second entry in FIG. 4(*b*) indicates that data is to be acquired from the web server 21 on Thursday of each week. Scheduler setting data stored in association with the URL of the third entry in FIG. 4(*b*) indicates that data is to be acquired from the web server 21 everyday at 10:00.

The CPU 111 reads the scheduler setting data from the URL data storage unit 115C and determines whether or not the scheduler setting data conforms to the current date and time. When the scheduler setting data conforms to the current date and time, then the CPU 111 downloads the data specified by the URL. Accordingly, by setting a prescribed date and time for accessing a URL specifying network data that includes a plurality of URLs, it is possible to periodically acquire such network data, as described below.

The transfer destination data storage unit 115D stores printer transfer address data and personal computer transfer address data. The transfer destination data storage unit 115D stores private IP addresses on a LAN and port numbers as address data for printer transfers and personal computer transfers.

As shown in FIG. 4(*c*), the record/display setting storage unit 115I stores, in correspondence with "specification", a "recording setting" as print setting data for outputting data via the recording unit 37 and a "display setting" as display setting data for displaying data on the LCD 274.

In the example of FIG. 4(*c*), for the specification of "image output", the data "ON" is stored for the recording setting and "OFF" for the display setting. This indicates that image output for printing is set to ON, while image output for the LCD 274 is set to OFF. For the specification item of "resolution", "600 dpi" is stored for the recording setting and "96 dpi" is stored for the display setting. This indicates that the resolution is set to 600 dpi for printing and 96 dpi for display on the LCD 274.

Figure 5:
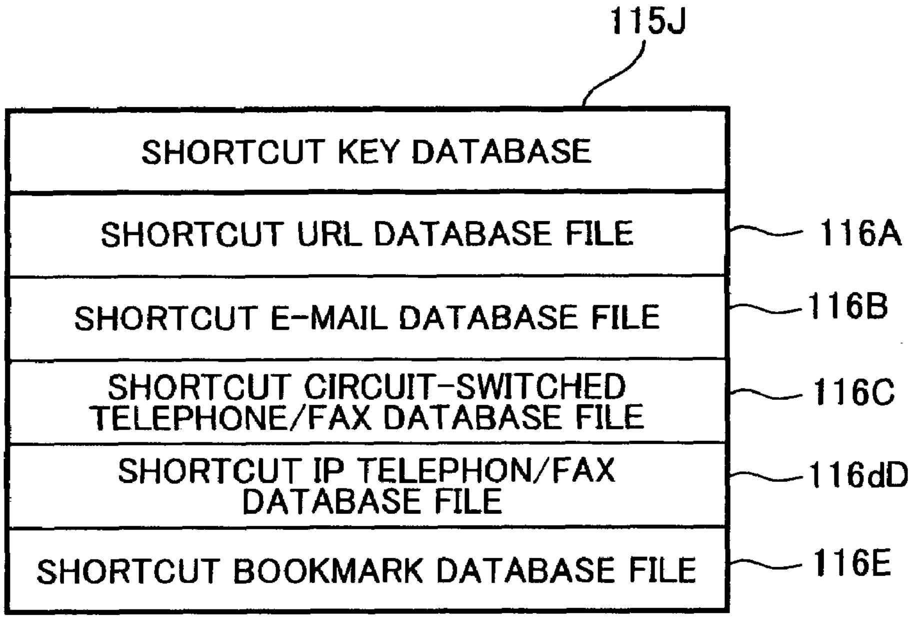
FIG. 5 is an explanatory diagram showing the general data structure of a shortcut key database in the RAM.

As shown in FIG. 5, the shortcut key database 115J includes a shortcut URL database file 116A, a shortcut e-mail database file 116B, a shortcut circuit-switched telephone/fax database file 116C, a shortcut IP telephone/fax database file 116D, and a shortcut bookmark database file 116E.

The shortcut URL database file 116A functions as a database of web printing shortcut keys used when communicating with the web server 21 on the Internet. The shortcut URL database file 116A is configured to store a plurality of entries (a maximum of 60 in the present embodiment). As shown in FIG. 10(*b*), each entry includes a comment and URL associated with a key number representing the shortcut key on the operating panel 27.

The shortcut e-mail database file 116B functions as a database of e-mail shortcut keys used when transmitting e-mail. The shortcut circuit-switched telephone/fax database file 116C functions as a database of circuit-switched telephone/fax shortcut keys used for circuit-switched telephone and fax communications. The shortcut IP telephone/fax database file 116D functions as a database of IP telephone/fax shortcut keys used for IP telephone and fax communications. The shortcut bookmark database file 116E functions as a database of bookmark shortcut keys used when specifying a URL stored as a bookmark.

Figure 6A:
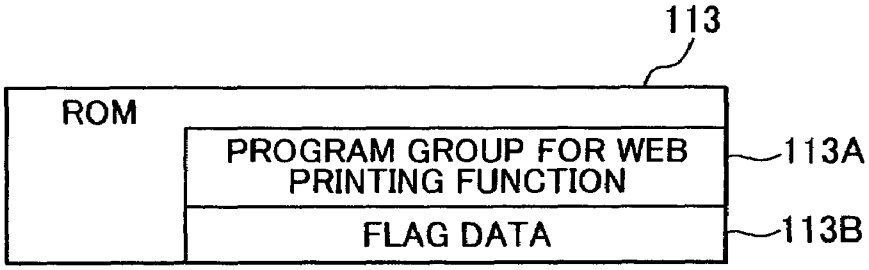
FIG. 6(*a*) is an explanatory diagram showing the data structure of a ROM.

As shown in FIG. 6(*a*), the ROM 113 in the web printing unit 110 stores a program group 113A for a web printing function, flag data 113B, and the like. The program group 113A are for acquiring data from the web server 21 and for controlling the recording unit 37 of the facsimile device 1 to print the acquired data. The flag data 113B represents operating conditions of the web printing function.

More specifically, the web printing unit 110 includes a printing function for controlling the recording unit 37 to print images based on data downloaded from the web server 21 via the router controller 101; a saving function for temporarily saving data in the RAM 115; a printer transferring function for transferring downloaded data to the printer (a printer identified by address data stored in the transfer destination data storage unit 115D as the printer transfer destination) connected to the LAN via the LAN connection port 7; a personal computer transferring function for transferring downloaded data to the personal computers connected to the LAN via the LAN connection port 7; a monochrome printing function for instructing the recording unit 37 to print monochrome images based on downloaded data; a quiet printing function for controlling the recording unit 37 to print images based on the downloaded data in the quiet print mode for suppressing device noise during the printing process; a log saving function for saving log data for various processes executed by the web printing unit 110; an error data displaying function for displaying error messages on the LCD 274; and a shortcut key database updating function for requesting network data that includes a plurality of URL data, as described below, and for storing the network data in the shortcut URL database file 116A (FIG. 5) of the shortcut key database 115J. These functions are implemented by the program group 113*a* stored in the ROM 113. The functions can be toggled ON and OFF based on flags set in flag setting data stored in the RAM 115. Details will be described below.

The web printing unit 110 stores flag setting data into the RAM 115 according to prescribed conditions in a following manner. FIG. 6(*b*) is an explanatory diagram illustrating the data structure of the flag data 113B stored in the ROM 113. According to prescribed conditions, the web printing unit 110 selects one of operating modes shown in FIG. 8. The operating modes include a "normal" operating mode, a "URL access not authorized" operating mode, a "cancel print" operating mode, a "password error" operating mode, a "keyword error" operating mode, a "same content detected" operating mode, a "nighttime print" operating mode, an "answering machine" operating mode, a "large volume monochrome printing" operating mode, an "out-of-paper error" operating mode, and an "out-of-toner error" operating mode.

Then, the web printing unit 110 retrieves function values (hereinafter referred to as "flag values") of the selected operating mode, and stores the retrieved flag values into the RAM 115 as the flag setting data. The web printing unit 110 operates the function (ON) when the flag value is "1" or greater and prevents operation of the function (OFF) when the flag value is "0". The asterisk (*) symbol indicates that the flag value stored as the flag setting data prior to selecting the operating mode cannot be overwritten.

Figure 7A:
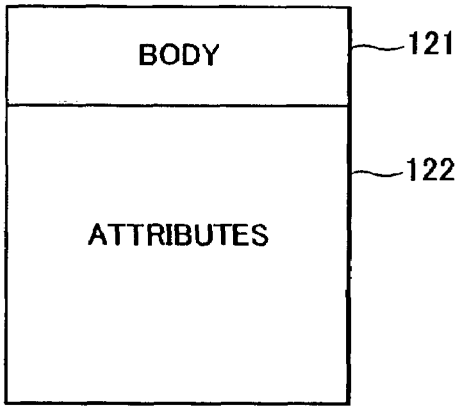
FIG. 7(*a*) is an explanatory diagram showing the structure of data downloaded via a router controller by a CPU in the web printing unit.
Figure 7B:
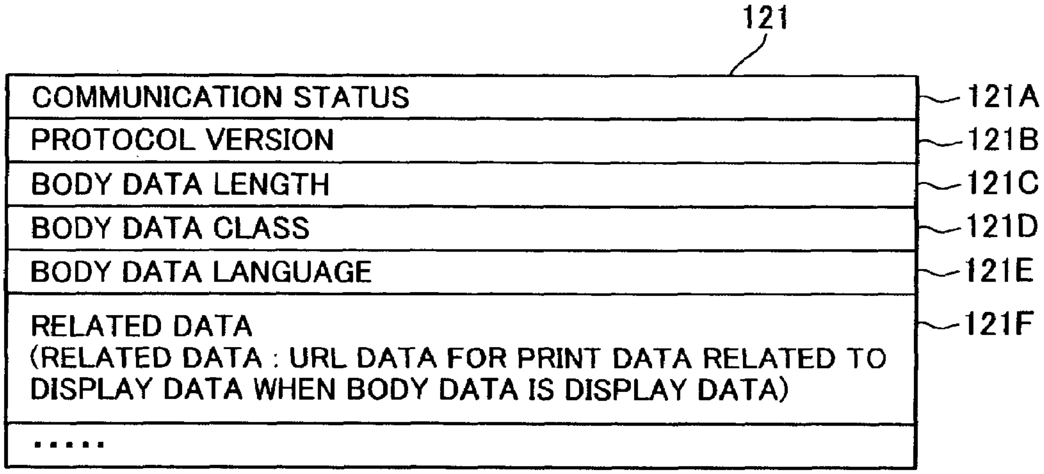

Next, the structure of data downloaded by the CPU 111 via the web printing unit 110 will be described. As shown in FIG. 7(*a*), data downloaded via the web printing unit 110 includes attributes 121 and a body 122. As shown in FIG. 7(*b*), the attributes 121 include a communication status 121A indicating whether communication with the web server 21 has completed normally and including an error code or the like when the communication process has not ended normally; a protocol version 121B representing the version of the communication protocol; a body data length 121C representing the amount of data in the body 122; a body data class 121D expressing whether the data in the body 122 is network data that includes one or more URLs or another type of data; a body data language 121E expressing the language type of the text (HTML, XHTML, etc.) used in the body 122; related data 121F configured of URL data for print data related to the display data when the body data is display data; and the like.

The body 122 is configured of HTML (HyperText Markup Language), image files, PDL (Printer Description Language) that can be directly recognized by the recording unit 37, or the like.

Next, a control process executed by the CPU 111 in the web printing unit 110 will be described with reference to FIGS. 8 through 10. The control process is executed to download network data, that includes one or more URLS, from the web server 21 or the like on the Internet and to automatically store the downloaded data in the shortcut URL database file 116A of the shortcut key database 115J (FIG. 5).

Figure 8:
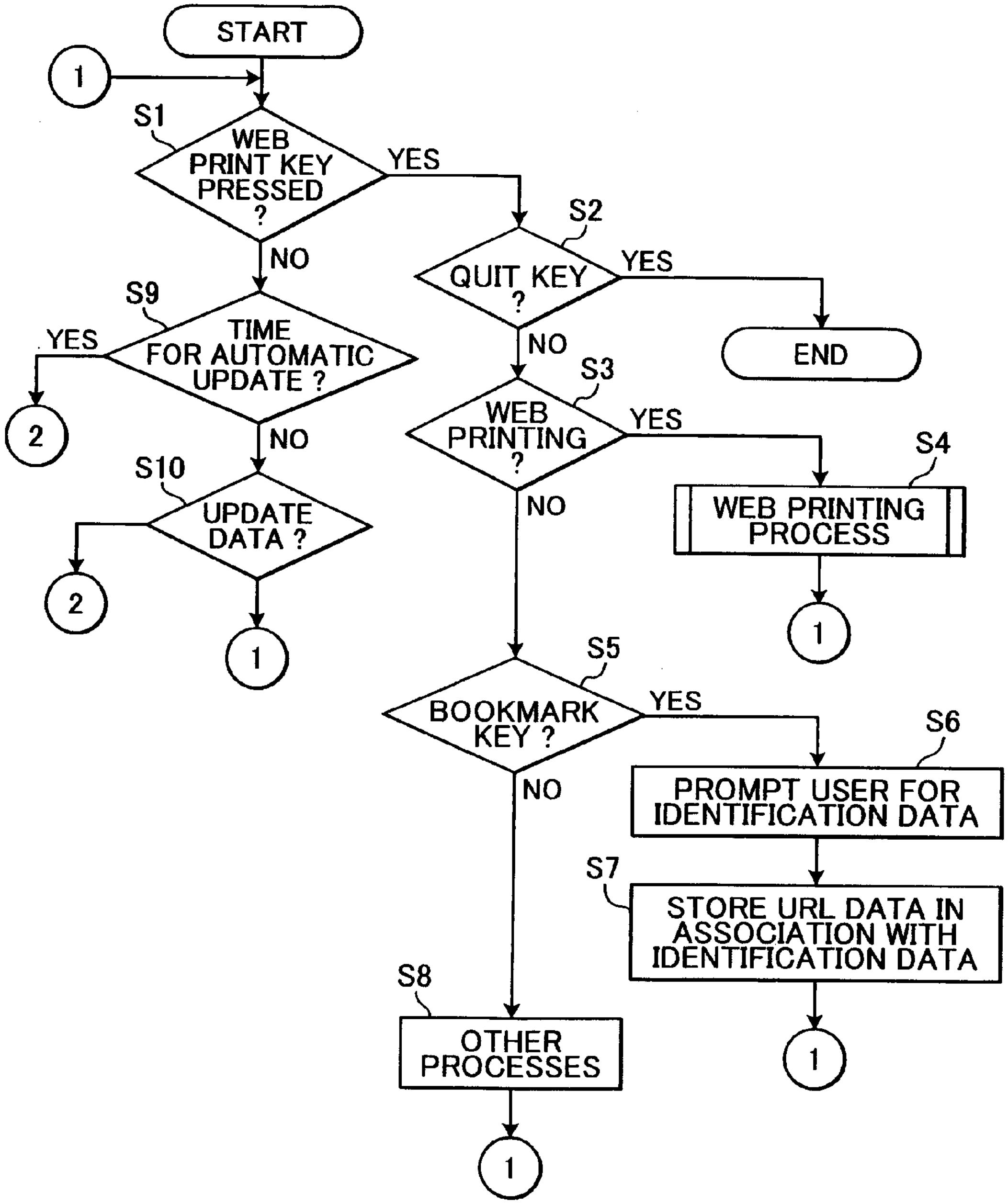
FIG. 8 is a main flowchart representing a control process executed by the CPU of the web printing unit.

FIG. 8 is a main flowchart representing a control process executed by the CPU 111. As shown in FIG. 8, first in Step 1 (hereinafter Step will abbreviated to "S") it is determined whether or not the user has pressed any key provided in the operating panel 27.

If so (S1:YES), then in S2, the CPU 111 determines whether or not the pressed key is a Quit button (not shown). If so (S2:YES), then the process ends. On the other hand, if not (S2:NO), then in S3, the CPU 111 determines whether or not the pressed key is a Web print key. If so (S3:YES), then the process proceeds to S4, where the CPU 111 executes the web printing process.

The web printing process will be described with reference to the flowchart of FIG. 9. As shown in FIG. 9, in S11 the CPU 111 displays an input prompt on the LCD 274, prompting the user to specify a URL. Then, in S12, the CPU 111 receives an input-complete signal from the operating panel 27 via the interface 93, the router controller 101, the HUB 103, and the network interface 117. The input-complete signal indicates that a URL has been specified by the user. Here, the user can specify a desired URL either by directly inputting the URL character string or by inputting a shortcut key representing the desired URL (FIG. 10(*b*)), for example.

Then, in S13, the CPU 111 downloads data specified by the URL from the web server 21 via the router controller 101. The downloaded data is stored in the transmission/reception data storage unit 115B of the RAM 115.

In S14, the CPU 111 determines whether or not the downloaded data is network data by referencing the body data class 121D of the attributes 121 of the downloaded data. If the body data class 121D indicates that the body 122 stores network data, then the CPU 111 determines that downloaded data is network data. FIG. 10(*a*) shows an example of network data, detailed description thereof will be described later.

If the CPU 111 determines in S14 that the downloaded data is not network data (S14:NO), then in S15, the CPU 111 executes printing process in the following manner. First, the CPU 111 reads recording settings, such as the image output and resolution, from the record/display setting storage unit 115I (FIG. 4(*c*)). If the image output in the recording settings is ON, then the CPU 111 transmits the body 122 to the recording unit 37 via the interface 93, and the recording unit 37 prints out the data according to the resolution and the like stored in the record/display setting storage unit 115I. Then, the sub process ends, and the control process returns to S1 in FIG. 8.

On the other hand, if the downloaded data is network data (S14:YES), then in S16, the CPU 111 deletes all entries of comments and URLs from the shortcut URL database file 116A (FIG. 10(*b*)).

In S17, the CPU 111 determines whether or not all entries have been registered in the shortcut URL database file 116A. If so (S17:YES), then the sub process ends. On the other and, if not (S17:NO), then in S18, the CPU 111 reads one comment and URL entry from the network data. In S19, the CPU 111 stores the comment and URL of the single entry in the "comment" area and "URL" area corresponding to the lowest key number not having an entry in the shortcut URL database file 116A.

In S20, the CPU 111 determines whether or not there remains any free key numbers for which a comment or URL have not been stored. If there remains free key numbers (S20:YES), then the process returns to S17. On the other hand, if no free key numbers remain (S20:NO), then the sub process ends.

Here, an example of the body 122 in the network data will be described based on FIG. 10(*a*). In the description of the body 122 shown in FIG. 10(*a*), one entry of network data is sandwiched between <record> and </record>, while one entry of comment data is interposed between <comment> and </comment>. Further, a URL entry is interposed between <URL> and </URL>.

For example, the first comment in FIG. 10(A) is "nationwide weather", while the URL is http://www.xweather.com/nationwide. The second comment data is "Hokkaido region", while the URL is http://hokkaido.xweather.com/. The third comment is "Tohoku region," while the URL is http://tohoku.xweather.com/new. The fourth comment is "Hokuriku region", while the URL is http://hokuriku.xweather.com/.

Through the processes of S17 through S20 described above, network data is sequentially stored in association with key numbers in the shortcut URL database file 116A. For example, as shown in FIG. 10(*b*), "nationwide weather" is stored in the comment area of key number 1 and "http://www.xweather.com/nationwide" is stored in the URL area of key number 1. "Hokkaido region" and "http://hokkaido.xweather.com/" are stored in the comment area and URL area of key number 2. "Tohoku region" and "http://tohoku.xweather.com/new" are stored in the comment area and URL area of key number 3. "Hokuriku region" and "http://hokuriku.xweather.com/" are stored in the comment area and URL area of key number 4.

Returning to FIG. 8, if it is determined in S3 that the pressed key is not the Web print key (S3:NO), then in S5, the CPU 111 determines whether or not the pressed key is a URL bookmark key (not shown). If so (S5:YES), then in S6, the CPU 111 displays an input prompt on the LCD 274 enabling the user to specify a desired URL and to input a comment as identification data. When the user specifies a URL and inputs the comment in S6, the CPU 111 receives an input complete signal from the operating panel 27 via the interface 93, the router controller 101, the HUB 103, and the network interface 117 in S7, and, also in S7, the CPU 111 associates the specified URL with the inputted comment data and stores the both in the shortcut bookmark database file 116E. Then, the process returns to S1.

On the other hand, if the pressed key is not the URL bookmark key (S5:NO), then in S8, the CPU 111 executes another process indicated by the pressed key, and subsequently the process returns to S1.

If it is determined in S1 that no key has been pressed (S1:NO), then in S9, the CPU 111 determines whether or not it is an update timing. More specifically, the CPU 111 reads the scheduler setting data from the URL data storage unit 115C (FIG. 4(*b*)) and determines whether or not the scheduler setting data conforms to the current date and time. If the settings data conforms to the current date and time, then S9 results in a positive determination (S9:YES), then the process proceeds to S13 in FIG. 9 so as to download corresponding data (S13) and to execute the printing process (S15) or to update the shortcut key database 115J (S16 through S20).

On the other hand, if the scheduler setting data does not conform to the current date and time (S9:NO), then in S10, the CPU 111 determines whether or not update-notification data has been received from the web server 21. The update-notification data indicates that network data has been updated. Here, in this embodiment, the web server 21 is configured to store a URL when such a URL is received from a user. Also, when network data that the web server 21 has updated, then the web server 21 transmits the update-notification data and a URL that indicates the updated network data to the user to whom the web server 21 has transmitted previous network data prior to the update.

Figure 9:
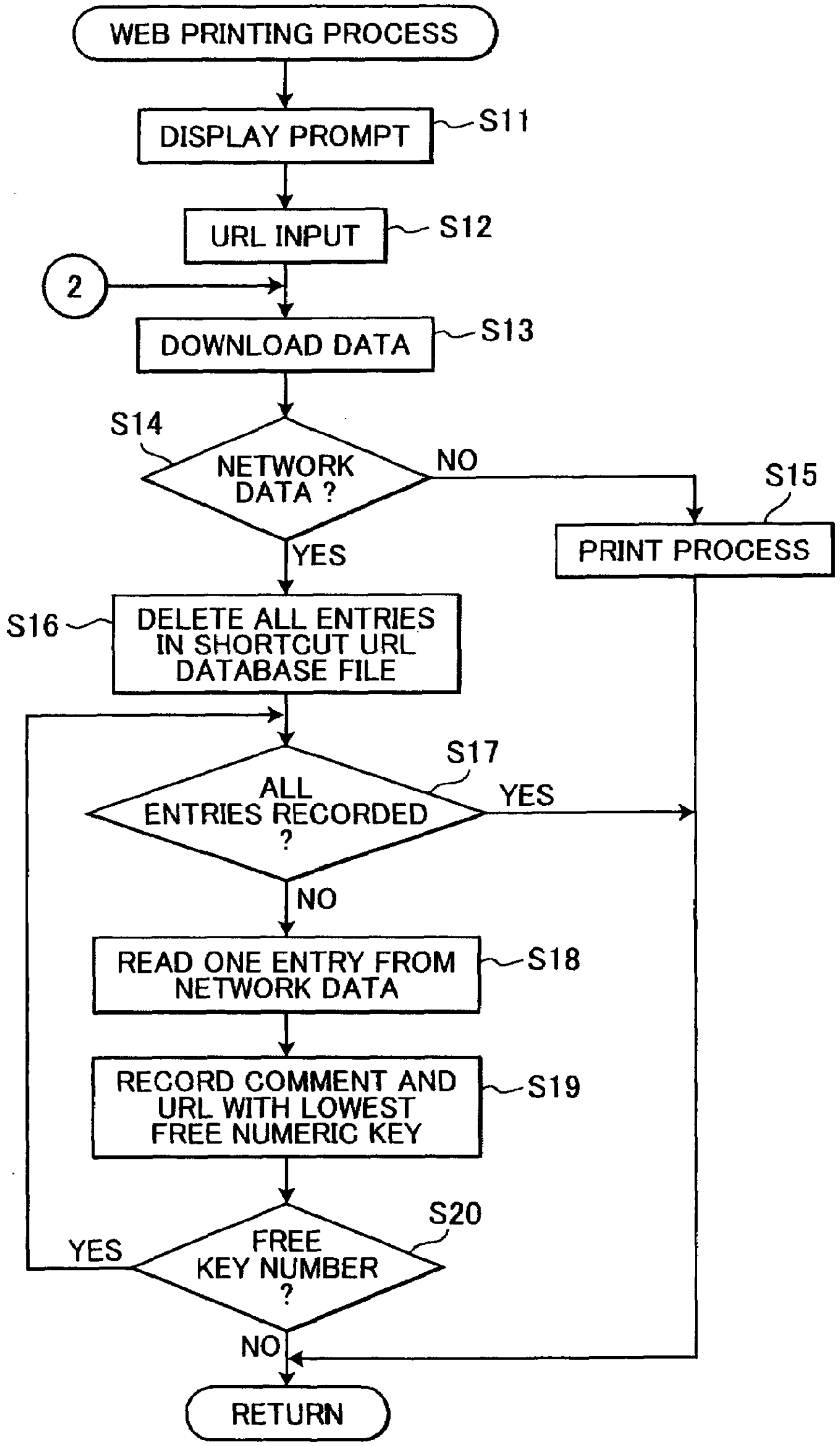
FIG. 9 is a flowchart representing a sub process of the web printing process of FIG. 8.

If the CPU 111 determines in S10 that the update-notification data has been received (S10:YES), then the process proceeds to S13 in FIG. 9 so as to download the updated network data specified by the received URL (S13) and to update the shortcut key database 115J (S16 through S20). On the other hand, if the update-notification data has not been received (S10:NO), then the process returns to S1.

As described above, the facsimile device 1 according to the present embodiment is provided with the web printing unit 110. When the Web Print key provided on the operating panel 27 is pressed, the web printing unit 110 displays an input prompt on the LCD 274 prompting the user to specify a desired URL. Then, the CPU 111 downloads data specified by the URL from the web server 21. If the downloaded data is network data, then the CPU 111 deletes all entries in the shortcut URL database file 116A and subsequently stores the received network data in association with shortcut key numbers in the shortcut URL database file 116A. In this manner, the shortcut URL database file 116A is automatically updated at a desired time with the latest updated or added address data (URLs), enabling the user to reliably obtain desired content based on the latest network data. On the other hand, if the downloaded data is not network data, the data is printed on recording paper, enabling the user to easily obtain desired content without performing a complex operation.

Further, data content of desired URL is automatically downloaded and printed at prescribed intervals based on scheduler setting data in the URL data storage unit 115C (FIG. 4(*b*)). Accordingly, the user can quickly, easily, and reliably obtain desired content through a simple, prescribed process.

When update-notification data indicating that network data has been updated is received from the web server 21, the updated network data is automatically downloaded and stored in the shortcut URL database file 116A, thereby updating the information in the shortcut URL database file 116A. Hence, by pressing a prescribed shortcut key, the user can always easily, quickly, and reliably request content corresponding to the latest address data.

In the description of the body 122 of the downloaded data, data sandwiched between <record> and </record> represents one entry of network data; data sandwiched between <comment> and </comment> represents comment data; and data sandwiched between <URL> and </URL> represents the URL. By determining whether a prescribed mark is included in the body 122, it is possible to extract the address data (URL) of the first entry and store the address data in the shortcut URL database file 116A. Accordingly, the process to update the shortcut URL database file 116A can be performed quickly, and the memory capacity required to store the processing program can be reduced.

FIG. 11(*a*) shows another example of the body 122 in network data. In this example, a description of the network data is sandwiched between the tags <HTML> and </HTML>. The data sandwiched between the tags <A and </A> (anchor tags) represents one entry of network data. The data sandwiched between the tags <A . . . > and </A> represents the comment data. The data delineated by quote marks in the string href=". . . " represents the URL data.

Specifically, the comment of the first entry in FIG. 11(A) is "nationwide weather", and the URL is http://www.x-weather.com/nationwide. The comment of the second entry is "Hokkaido region" and the URL is http://hokkaido.x-weather.com/. The comment of the third entry is "Tohoku region" and the URL is http://tohoku.xweather.com/new. The comment of the fourth entry is "Hokuriku region" and the URL is http://hokuriku.xweather.com/.

In this case also, through the processes of S17 through S20 described above, the network data is sequentially stored in association with key numbers in the shortcut URL database file 116A. More specifically, as shown in FIG. 11(*b*), "nationwide weather" is recorded in the comment area of key number 1 and "http://www.xweather.com/nationwide" is stored in the URL area of key number 1. "Hokkaido region" and "http://hokkaido.xweather.com/" are stored in the comment area and URL area of key number 2. "Tohoku region" and "http://tohoku.xweather.com/new" are stored in the comment area and URL area of key number 3. "Hokuriku region" and "http://hokuriku.xweather.com/" are stored in the comment area and URL area of key number 4.

The body 122 of the downloaded data is described in HTML, wherein network data is sandwiched between the tags <HTML> and </HTML>, and the data sandwiched between tags <A and </A> represents one entry of network data. With this construction, by determining whether the anchor tags <A and </A> are included in the network data sandwiched between the <HTML> and </HTML> tags, it is possible to extract one entry of network data and record the entry as a comment and URL corresponding to one key in the shortcut URL database file 116A. Accordingly, the process to update data in the shortcut URL database file 116A can be performed quickly and the memory capacity required for storing the processing program for updating the data can be decreased in size.

Further, the <A and </A> tags representing one entry of network data, the <A . . . > and </A> tags representing comment data, and href=". . . " representing the URL data are tags and symbols representing links to prescribed address data described in HTML. Therefore, if data received from the web server 21 includes these types of tags, even when the received data is described in HTML, the data can be recognized as network data and used to update data in the shortcut URL database file 116A.

While some exemplary embodiments of this invention have been described in detail, those skilled in the art will recognize that there are many possible modifications and variations which may be made in these exemplary embodiments while yet retaining many of the novel features and advantages of the invention.

The data can be described in a prescribed language that need not be HTML, such as XML (exXtensible Markup Language) or XHTML (extensible HTML). Accordingly, the image forming device of the present invention can support a more extensible language.

What is claimed is:

1. An image forming device comprising:

a communicating unit that performs bi-directional communications with a server on an Internet;

an input unit that inputs a first address data to the communicating unit, wherein the communicating unit transmits a request data to the server when the first address data was input to the communicating unit, the request data requesting the server to transmit a web data corresponding to the first address data, and the communicating unit receives the web data corresponding to the first address data from the server;

an image forming unit that forms images on a recording medium based on the web data;

a determining unit that determines whether the web data received by the communicating unit is a network data, the network data including at least one set of second address data;

a first memory that includes a shortcut database that stores a third address data in association with a third corresponding operation data; and an update unit that updates the shortcut database; and a control unit that controls the image forming unit and the update unit, wherein the control unit controls, when the web data is determined to be the network data, the update unit updating the shortcut database by storing the at least one set of second address data included in the network data into the shortcut database in association with a second corresponding operation data, and the control unit controls, when the web data is determined not to be the network data, the image forming unit forming images on a recording medium based on the web data.

2. The image forming device according to claim 1, wherein the input unit periodically inputs the first address data into the communicating unit.

3. The image forming device according to claim 1, further comprising a second memory that stores a fourth address data specifying the network data on the server, wherein the input unit periodically and automatically inputs the fourth address data stored in the second memory to the communicating unit.

4. The image forming device according to claim 1, further comprising a second memory that stores a fourth address data specifying the network data on the server, wherein the communicating unit further receives an update notification from the server indicating that the network data has been updated, and the input unit automatically input the fourth address data stored in the second memory to the communicating unit when the communicating unit has received the update notification.

5. The image forming device according to claim 1, wherein the determining unit determines that the web data is the network data when the web data includes a predetermined mark.

6. The image forming device according to claim 1, wherein the determining unit determines that the web data is the network data when the web data includes a predetermined tag.

7. The image forming device according to claim 6, wherein the predetermined tag represents a link to a predetermined address data.

8. The image forming device according to claim 1, wherein the update unit deletes one or more portions of the network data currently stored in the shortcut database when updating the shortcut database.

9. The image forming device according to claim 1, further comprising operation keys enabling a user to manually specify the first address data to input to the communicating unit, wherein a first corresponding operation data is data indicating the operation keys.

* * * * *